US007668967B2

(12) United States Patent
Unger (10) Patent No.: US 7,668,967 B2
(45) Date of Patent: *Feb. 23, 2010

(54) METHOD AND SYSTEM FOR PROVIDING AND CONTROLLING SUB-BURST DATA TRANSFERS

(75) Inventor: Robert Allan Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/935,294

(22) Filed: Nov. 5, 2007

(65) Prior Publication Data

US 2008/0059664 A1  Mar. 6, 2008

Related U.S. Application Data

(63) Continuation of application No. 10/113,323, filed on Mar. 28, 2002, now Pat. No. 7,337,232.

(51) Int. Cl.
*G06F 15/16* (2006.01)
(52) U.S. Cl. ................ 709/232; 709/217; 709/219; 709/230; 709/231; 709/246; 710/35
(58) Field of Classification Search ................ 709/217, 709/219, 230, 232, 246; 710/35
See application file for complete search history.

(56) References Cited

U.S. PATENT DOCUMENTS 6,134,596 A * 10/2000 Bolosky et al. ............ 709/233
6,212,657 B1    4/2001 Wang et al.
6,360,299 B1    3/2002 Arimilli et al.
6,415,326 B1    7/2002 Gupta et al.
6,466,987 B2   10/2002 Bolosky et al.
2002/0116447 A1 * 8/2002 Bolosky et al. ............ 709/203

OTHER PUBLICATIONS

*PCT International Search Report*, United States International Search Authority, from corresponding PCT Application No. PCT/US03/07821, mailed Jul. 3, 2003, 5 pgs.

* cited by examiner

*Primary Examiner*—Yves Dalencourt
(74) *Attorney, Agent, or Firm*—Fitch, Even, Tabin & Flannery (57) ABSTRACT

The present apparatus and method control the flow of communication between a host and a data storage device. A plurality of data transport streams are maintained as active while a first burst of data for a first transport stream is initiated. The first burst is interrupted prior to the complete communication of the burst. The first transport stream is maintained as active and a first burst of data for a second transport stream is initiated. The first burst of the second transport stream is interrupted, the second transport stream is maintained as active and the method and apparatus return to continue the communication of the first burst of the first transport stream. Typically, a first stream ID is asserted prior to initiating the first burst of the first transport stream and a second stream ID is initiated prior to initiating the first burst of the second transport stream.

14 Claims, 7 Drawing Sheets

| Description | Host | Dir | Dev | Acronym |
|---|---|---|---|---|
| Cable select | | → | | CSEL |
| Chip select 0 | | → | | CS0- |
| Chip select 1 | | ←→ | | CS1- |
| Data bus bit 0 | | ←→ | | DD0 |
| Data bus bit 1 | | ←→ | | DD1 |
| Data bus bit 2 | | ←→ | | DD2 |
| Data bus bit 3 | | ←→ | | DD3 |
| Data bus bit 4 | | ←→ | | DD4 |
| Data bus bit 5 | | ←→ | | DD5 |
| Data bus bit 6 | | ←→ | | DD6 |
| Data bus bit 7 | | ←→ | | DD7 |
| Data bus bit 8 | | ←→ | | DD8 |
| Data bus bit 9 | | ←→ | | DD9 |
| Data bus bit 10 | | ←→ | | DD10 |
| Data bus bit 11 | | ←→ | | DD11 |
| Data bus bit 12 | | ←→ | | DD12 |
| Data bus bit 13 | | ←→ | | DD13 |
| Data bus bit 14 | | ←→ | | DD14 |
| Data bus bit 15 | | ←→ | | DD45 |
| Device active or slave (Device 1) present | | (see note) | | DASP- |
| Device address bit 0 | | → | | DA0 |
| Device address bit 1 | | → | | DA1 |
| Device address bit 2 | | → | | DA2 |
| DMA acknowledge | | → | | DMACK- |
| DMA request | ← | | | DMARQ |
| Interrupt request | ← | | | INTRQ |
| I/O read<br>DMA ready during Ultra DMA data in burst<br>Data strobe during Ultra DMA data out burst | | →<br>→<br>→ | | DIOR-<br>HDMARDY-<br>HSTROBE |
| I/O ready<br>DMA ready during Ultra DMA data out burst<br>Data strobe during Ultra DMA data in burst | ←<br>←<br>← | | | IORDY<br>DDMARDY-<br>DSTROBE |
| I/O write<br>Stop during Ultra DMA data burst | | →<br>→ | | DIOW-<br>STOP |
| Passed diagnostics<br>Cable assembly type identifier | (see note)<br>(see note) | | | PDIAG-<br>CBLID- |
| Reset | | → | | RESET- |

METHOD AND SYSTEM FOR PROVIDING AND CONTROLLING SUB-BURST DATA TRANSFERS

PRIORITY CLAIM

This application is a continuation of application Ser. No. 10/113,323, now U.S. Pat. No. 7,337,232, filed Mar. 28, 2002, by Robert Unger and entitled METHOD AND SYSTEM FOR PROVIDING AND CONTROLLING SUB-BURST DATA TRANSFERS, which is incorporated herein by reference in its entirety.

BACKGROUND

1. Field of the Invention

The present invention relates generally to digital data formatting and communication, and more specifically to the format and communication of digital video, audio, animation and other digital information.

2. Discussion of the Related Art

The exchange of data between a data storage device, such as a disk drive, and a host, such as a computer or CPU, requires large amounts of data to be communicated back and forth. As the amount of data transferred between components of a system increases, the need to transmit more data at once (wider path) or to increase the speed of the communication (higher clocking frequency) additionally increases.

Previous systems have attempted to improve the communication speed of data between data storage and a host. One approach has been to have a wide data path that is used in a half duplex mode (i.e., one direction at a time). Throughput was enhanced by concentrating transfers into large uninterrupted buffers sent in bursts. These bursts are scheduled by such systems and communicate a burst of information during a burst period.

Quite often the buffer size for maximum data exchange between a data storage device and a host does not match the production/consumption rate for the type of data being transferred. This is particularly true for streams of audio/video data. However, maximum exchange rates must be used since the storage device may be simultaneously used for multiple streams with only one stream's buffer active at any one time.

Further, the speed at which drives can communicate data to a host has also increased. As such, previous drives are capable of delivering data at a rate which far exceeds the rate at which the host can utilize the data. The host must maintain large buffers of data in order to fully transmit and receive the bursts and then slowly extract data from the local buffer as needed. This requires the data to be stored in both the host and the drive, duplicating the data and wasting resources.

Further, as the burst sizes increase, the size of buffers in both the host and the drive must be increased in order to be able to transmit and receive the large bursts of data. This results in an increased complexity and cost of previous systems.

SUMMARY OF THE INVENTION

The present invention advantageously addresses the needs above as well as other needs through a method and apparatus for controlling the flow of communication between a host and a data storage device. The method and apparatus provide communication control by maintaining a plurality of data transport streams active; initiating a first burst of data for a first transport stream between the host and the device; interrupting the first burst of the first transport stream; maintaining the first transport stream active; initiating a first burst of data for a second transport stream between the host and the device; interrupting the first burst of the second transport stream; maintaining the second transport stream active; and continuing the first burst of the first transport stream. The buffer size used on each side of the data communication can be optimized to match the local buffering requirements unique to each side, and different buffer sizes can be used on each side.

The method and apparatus further provide a system for managing data communication. The system includes a host having a plurality of stream identification (stream ID) inputs; data storage device having a plurality of stream ID outputs coupled with the stream ID inputs, such that the data storage device is configured to assert a plurality of stream IDs identifying one of a plurality of transport streams to the host; and the host being configured to determine routing of data communicated through the plurality of transport streams based on the stream IDs received from the data storage device.

The method and apparatus additionally provide an apparatus for providing data communication control. The apparatus, in one embodiment, includes a host having means for receiving one or more stream identifications (stream ID); and means for storing data includes: means for asserting the one or more stream IDs to identify one or more transport streams; means for maintaining a plurality of transport streams simultaneously active, wherein each of the plurality of transport streams is configured to communicate data between the host and the means for storing data; and means for controlling data communication such that data is communicated between the host and the means for store data in sub-bursts, where each sub-burst is associated with one of the one or more transport streams by one of the one or more stream IDs.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION

The following description is not to be taken in a limiting sense, but is made merely for the purpose of describing the general principles of the invention. The scope of the invention should be determined with reference to the claims.

In previous systems, a data bus between a data storage drive and a host, such as a computer, processor, microprocessor or the like, is shared such that data is either communicated from the host, or data is received by the host at a given instant. The data bus is not bi-directional at any given instant, but instead is a half-duplex system, where communication only occurs in one direction or the other. In attempts to optimize the use of this unidirectional bus, previous systems were designed to provide bursts or communicate blocks of data for a single source.

Integrated drive electronics (IDE) interfaces for disk drives have evolved over time to be optimized for transferring computer files in large bursts. Large cache buffers exist within the drive for staging data between the physical media and the IDE interface. These large caches permits continued data transfer across the interface while mechanical components are repositioned on the media. Large amounts of overhead and matching external buffering is required to implement storage and retrieval of data streams, for example audio/video (AV) streams and other data streams, through an IDE drive. Previous systems typically require an external means to accommodate the burst technique of IDE data transfers. Often these external means were achieved through large buffering. Previous systems employing IDEs allow only one burst buffer transfer to be active at a given time.

In attempts to further optimize systems, previous systems increased the size of buffers as the amount of data being communicated increased. This allowed for larger bursts to transmit larger blocks of information. For example, audio/video (AV) streaming or video content require large amounts of data transfers, and as such, large bursts have been used to communicate the data. Therefore, the buffer sizes have been increased in order to maximize the data throughput.

However, transmitting in buffer bursts requires the bus to be occupied for the entire burst, only allowing the bus to be utilized by a single source. As such, a source only has access to the bus periodically, so that the bus cannot be freed up for other communications from the same or other sources. As a result, only one communication stream can be active during a single burst period. Further, because of the large burst sizes, the data bus is occupied for large amounts of time holding off transfers for other streams.

Additionally, in previous systems data is often delivered at a rate which far exceeds the needs and capabilities of the device receiving and utilizing the data. For example, a driver driving data across a bus may be able to drive data onto the bus in burst of 100 MBytes per second (e.g., utilizing ultra-DMA 100 Mbytes), but the device receiving the data may only be capable of utilizing the data at a rate of 15 Mbits per second. This requires the receiving device to employ excessively large buffers to hold the excess delivered data until the device is ready for the data. Previous systems utilize bursts in an attempt to smooth data transfers. However, these previous systems end up with huge bursts of data, from large buffers optimized for disk drive efficiency, to a receiving device that cannot utilize the data at the rate being delivered. This results in previous systems having to reconcile mismatched speeds. Similarly, the drive can receive data at much greater rates than a device delivering the data can produce the data. Therefore, the host device must buffer the data in order to provide a burst of data to the drive.

As another example, some digital television systems (TV) utilize an IDE drive that is capable of communicating data in bursts of approximately 100 Mbytes per second according to fast, ultra-DMA. However, the TV utilizing the data to provide the image and sound may only be capable of utilizing 3 Mbits per second. Thus, the TV can utilize less than 1% of the information provided by the burst. This requires the host TV system to buffer the remaining 99% until it can use the excess delivered data. Further, the burst occupies the bus for the entire burst period to transmit the entire excessively large burst data, preventing other communications and data transfers.

In previous simple computers, only a relatively small amount of data (a few records) was communicated at a time. The bursts used to communicate the small amounts of data were relatively small. As such, it was not a problem to tie up the bus for a full burst period. However, as the amount of data being communicated increases, so does the buffer size, the burst size and the length of time to communicate a burst. As such, the burst occupies the bus for a greater period of time than is needed. Further, as described above, the receiving devices often cannot utilize the entire burst of data in real time and requires previous systems to include additional, large buffers to hold the excess data.

The present invention provides a mechanism that throttles back the data rate for individual data streams, without tying up the interface and bus while the data rate is throttled back. This allows the present apparatus and method to further optimize the use of the bus by allowing other data streams to share the bus using a smaller time slice granularity.

The present invention allows burst communications to be temporarily interrupted or halted, breaking up individual buffer transfers into sub-bursts or mini-bursts. Additionally, the present invention utilizes a plurality of buffers to establish a plurality of communication or transport streams. This allows the sub-bursts of data from the multiple buffers to be interleaved providing a greater amount of communication, optimizing the use of the bus and providing a smoother flow of data with less buffer length imposed latency. Thus, the present apparatus and method provide for a plurality of transport streams to be simultaneously active, and to shift or rotate between the plurality of simultaneously active transport streams to perform the sub-bursts of data transfers.

The present invention solves many of the problems seen with previous systems by in part utilizing several buffers to establish and maintain several simultaneously active data streams that all share the data bus. The sharing of the bus can be based on any shared configuration, including, a priority bases, a round robin manner, a combination of priority and round robin, and other such configurations. In one embodiment, the breaking up of the bursts of buffer transfers is achieved at the hardware level, resulting in improved performance and speed, and reducing the computational overhead required in previous systems software implementations.

In one embodiment, the present invention utilizes an addressing of the plurality of active data streams to allow accurate routing of the data transfers. For example, a host may have a plurality of stream identification (ID) inputs for receiving the identification of a data communication stream, and a disk drive or drive controller may include a plurality of stream ID outputs for asserting the identification of the data stream moving across the bus. In one embodiment, the present invention reconfigures what previous systems only utilized as unidirectional lines, ports and/or pins to be bi-directional, thus allowing a driver or drive controller to specify the data stream.

In one embodiment, the present apparatus and method take advantage of under utilized address lines or command lines of previous systems. The present invention utilizes what previous systems used only as unidirectional command or address lines and uses them as bi-directional lines. This allows the present invention to indicate which one of a plurality of active transport streams is ready to communicate data. The present invention can utilize any number of bi-directional lines to designate any number of active transport streams.

For example, the present invention can utilize three unidirectional signal lines used by previous devices, such as a host, to address registers in the drive (for example, an IDE drive), and can redefine those lines in the present invention to be bi-directional. These bi-directional address lines can then be driven by a drive when the host has granted control (for example direct memory access (DMA) control) to the drive. The drive uses these lines to indicate which one of a plurality of possible data transport streams is the subject of the current transfer. For example, if the present invention utilizes three data address bit lines (DA0-DA2) as bi-directional, the drive can specify up to eight different streams. It will be appreciated by one skilled in the art that the present invention can utilize additional communication lines which are unidirectional and dedicated for the purpose of asserting a stream identification (stream ID) to distinguish between the pluralities of the possible streams. However, in preferred embodiments, the present invention employs bi-directional lines, which reduces the pin count and/or coupling between components. Additionally, by utilizing bi-directional lines, chip layouts and connectors do not need to be re-engineered. The same chip configuration and design can continue to be used, thus saving costs. The same chip configuration allows the present invention to be implemented in previous systems without requiring the previous systems to be altered or redesigned.

In one embodiment, the present invention utilizes additional commands implemented in the drive firmware that permit the host to associate a stream or DMA identification with each active stream. Additionally, the present invention allows buffer burst sizes as well as an optimum transfer period to be specified by the host for each stream to permit the drive to optimize internal data transfers. Once these parameters are set by the host, a traditional data transfer command can be issued to the drive specifying the starting logic block address (LBA) and total transfer count. The drive can then partition its internal cache to stage data between the physical media (e.g., rotating disks) and the data transfer (e.g., DMA transfer).

Figure 1:
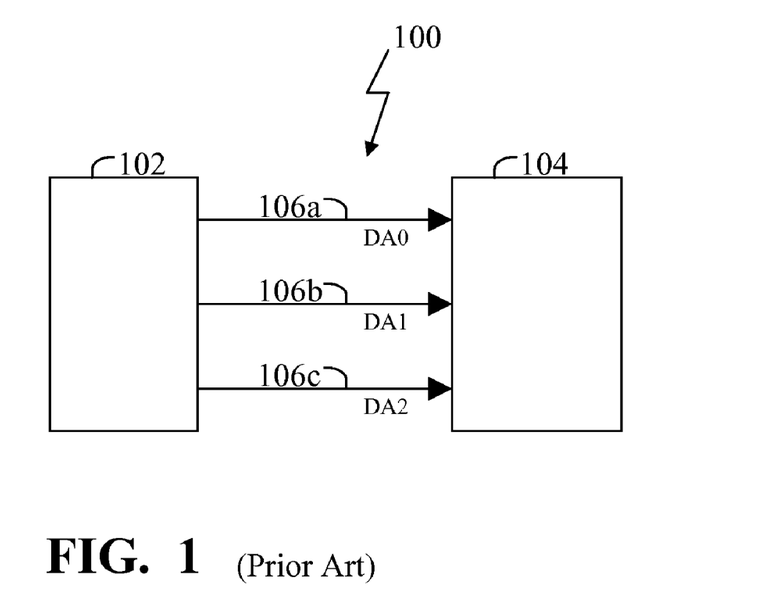
FIG. 1 depicts a block diagram of a previous system employing unidirectional use of signal lines.
Figure 2:
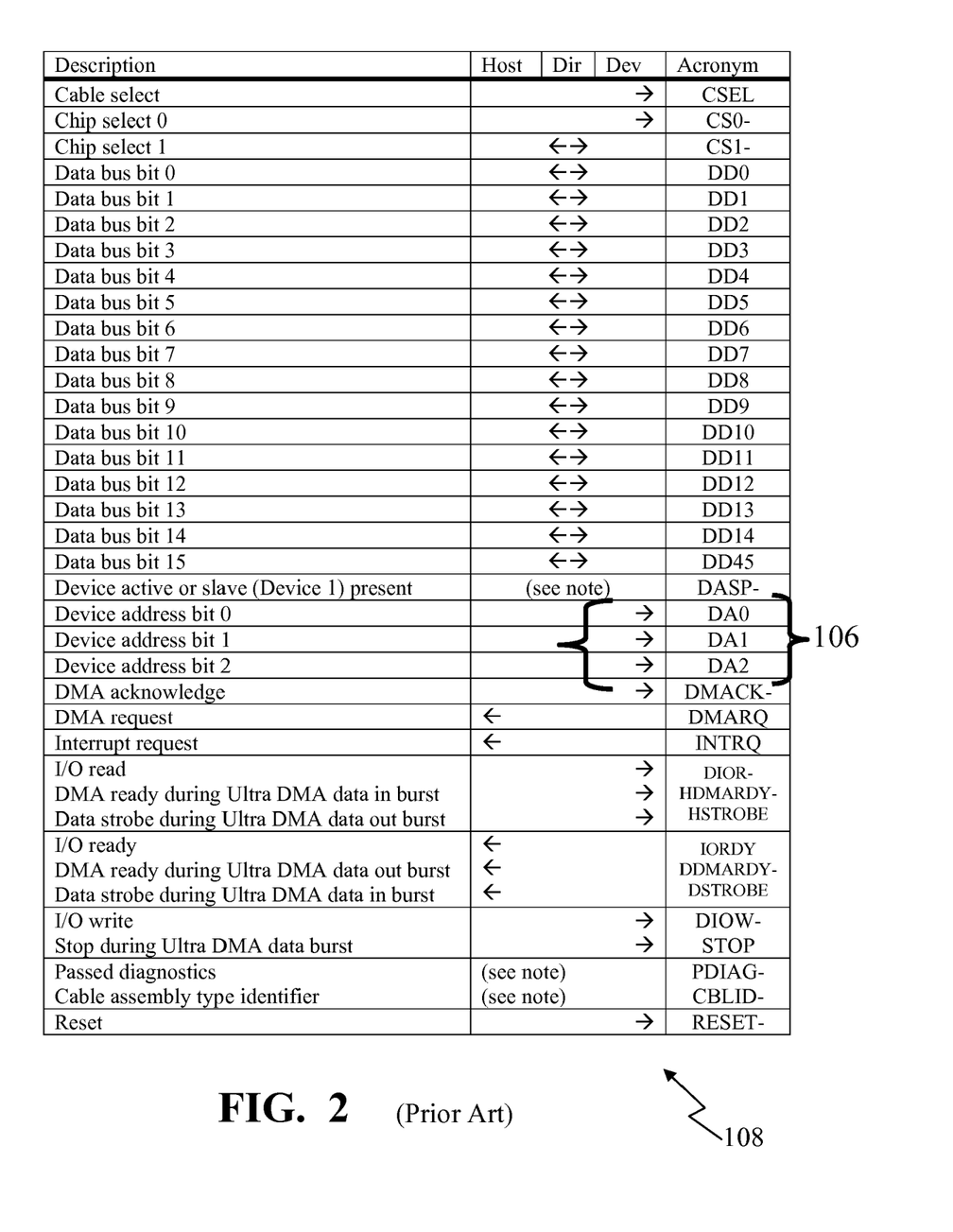
FIG. 2 depicts pin or line designations of a previous system that utilizes the unidirectional device address lines.

FIG. 1 depicts a block diagram of a previous system 100 employing unidirectional use of signal lines 106a-c. For example, a host 102 utilizes the unidirectional device address lines 106a-c (DA0, DA1 and DA2) to signal or activate a device 104, for example a data storage device or IDE drive. FIG. 2 depicts pin or line designations 108 of the previous system 100 that utilizes the unidirectional device address lines 106 (DA0-DA2) and requires the full buffer burst communication to completion. The host 102 issues a device address across the device address lines 106, and the device 104 recognizes the address and prepares to transmit or receive register data.

Figure 3:
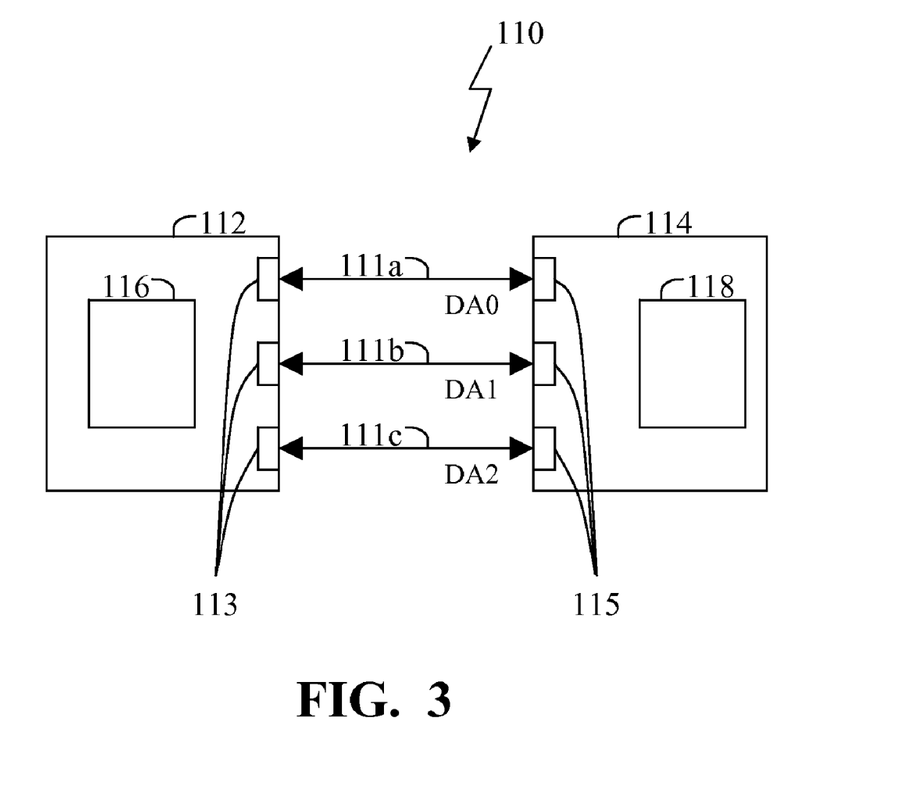
FIG. 3 depicts a simplified block diagram of a system according to one implementation of one embodiment of the present invention.

FIG. 3 depicts a simplified block diagram of a system 110 according to one implementation of one embodiment of the present invention. The present invention 110 utilizes a plurality of lines 111a-c to allow a device 114, such as a data storage device, to assert transport stream IDs to the host 112. As such, the device includes a plurality of stream ID outputs 115 and the host includes a plurality of stream ID input 113. In one embodiment, the present system 110 utilizes the lines 111a-c as bi-directional lines. For example, the lines 111 can be three device address lines DA0-DA2, or other lines that the previous systems utilized only unidirectionally. In one direction, sourced by the host 112, the present system operates in a similar fashion as the previous system where the host indicates a device register address. Additionally, the device 114, taking advantage of the bi-directionality of the lines, is capable of asserting the lines 111a-c to indicate a stream ID of one of a plurality of transport streams.

The host 112 receives the stream ID, and is capable of identifying the data to be communicated. In one embodiment, the host includes a DMA buffer router 116 that determines the routing of data to or from individual stream specific host buffers. For example, the host can identify, and thus determine where to route data to be received from the drive in a sub-burst, or determining what data from a plurality of sets of data is to be transmitted from the host over the data bus (e.g., which buffer of data). Generally, the device 114 uses the bi-directional lines 111 and the stream ID as assigned by the host as a switch control to indicate how the data bus is being utilized during a data transfer. In one embodiment, the drive includes firmware 118 that can be implemented as enhanced control logic, such as enhanced DMA control logic.

The system 110 is configured to operate similar to the previous systems (e.g., system 100) when the bi-directional lines 111 are sourced by the host 112 to control register access to the device 114. This allows the present invention to continue the legacy practice of communicating data in full bursts without interruption or temporarily halting the bursts. However, the present invention additionally is capable of utilizing the lines (for example, the device address lines DA0-DA2) in a bi-directional fashion to take advantage of the sub-burst capabilities. In one embodiment, the DMA buffer router 116 is configured to receive the stream ID from the device 114 and to determine the accurate routing of data to or from the data bus. Because the system 110 operates in a similar manner as previous devices, the present system can be implemented in systems and networks not capable of handling as well as utilizing the present function of providing several active transport streams each transmitting in sub-bursts or full bursts.

Figure 4:
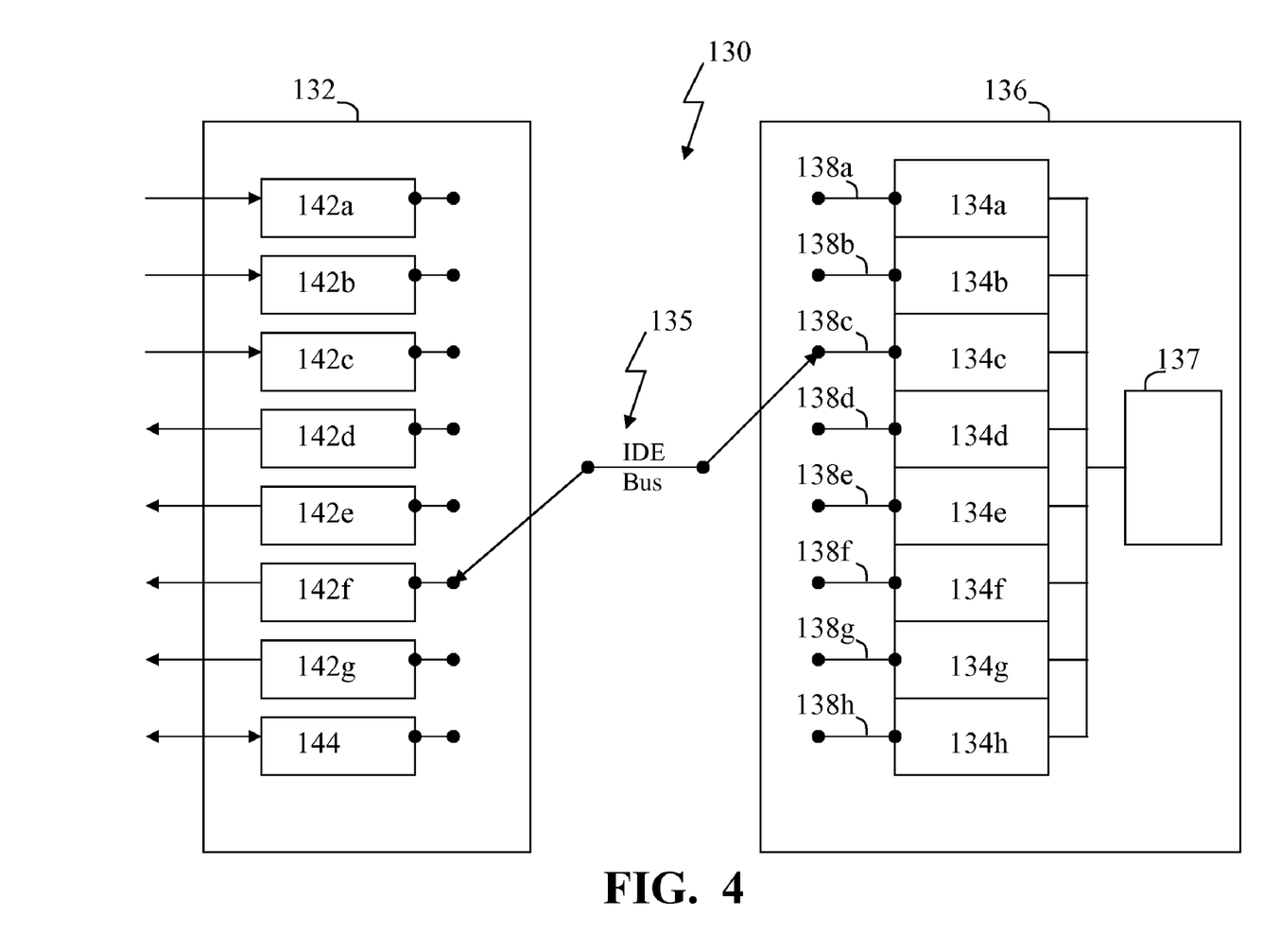
FIG. 4 depicts a simplified block diagram of a device according to one implementation of one embodiment of the present invention.

FIG. 4 depicts a simplified block diagram of a host/drive system 130 according to one implementation of one embodiment of the present invention. The host/drive system 130 includes a drive controller 132 component, which is typically part of a host, such as an IDE controller that couples with data storage device 136. In one embodiment, the drive controller 132 is a DMA buffer router, similar to the DMA buffer router 116 shown in FIG. 3. The storage device can be a disk drive, a compact disk (CD) drive, a magnetic tape drive or substantially any other storage device. In one embodiment, an IDE bus 135 is utilized to provide the coupling between the drive controller 132 and the disk drive 136. Drive control and coupling can be provided through substantially any data transfer device, including advanced technology attachment (ATA) devices, advanced technology attachment packet interface (ATAPI) devices and substantially any other device capable of establishing communication between the host and the disk drive.

The host/drive system 130 is configured to establish and maintain a plurality of simultaneously active data streams to allow the communication of data in sub-burst as well as full bursts. The disk drive 136 includes a plurality of cache buffers 134a-h, or a single cache buffer partitioned into a plurality of sub-buffers, for staging data between the physical storage media 137 and the IDE bus 135. The drive controller 132 includes a plurality of buffers 142*a*-*g* and 144 for staging data between the host 112 and the IDE bus 135. The drive controller buffers 142*a*-*g* and 144, can be implemented through first-in-first-out (FIFO) devices 142*a*-*f*, peripheral component interconnect (PCI) devices 144 for use with DMA, cache buffers and other temporary storage devices. The FIFOs 142*a*-*f* and/or PCI devices 144 in cooperation with the disk drive cache buffers 134*a*-*h* allow the present host/disk drive system 130 to establish and maintain a plurality of simultaneously active transport streams 138*a*-*h* for providing data communication between the host 112 and the disk drive 136. The drive 136 interleaves sub-bursts of data from each of the active data transport streams 138*a*-*h* as instructed by the host 112. In operation, for example retrieving data from the disk drive 136 to be transferred to the host, the disk drive 136 prepares to transfer data by initially accessing the storage media 137 (e.g., the rotating disks), and caching the data from the storage media to one of the internal cache buffers 134. The disk drive signals the host 112 that the data is available, for example the disk drive 136 activates a DMA request (DMARQ). Once the disk drive 136 receives an acknowledgement of the DMA request from the host (e.g., DMACK), and the data is available in the buffer 134, the disk drive 136 asserts the stream ID on the outputs 115 (see FIG. 3) to indicate a stream ID on the bi-directional lines 111 identifying the transport stream 138 that is ready to be forwarded.

Once the host 112 receives the stream ID, the host is capable of authorizing or denying the transfer of data through the identified transport stream. If the host authorizes the transfer of the transport stream 138, the disk drive activates a cache 134 for the appropriate transport stream (e.g., transport stream labeled 138*c*) to initiate the transfer of data from a buffer 134 to the drive controller 132 to be received by one of the FIFOs 142 or the PCI 144. The transfer of data continues until the remaining count previously designated by the host reaches zero, the defined burst size is reached, or a premature interrupt or termination is received by either the host or the disk drive 136. The interrupt can be initiated by the host 112 or the disk drive 136 if either device is not ready for data to be transferred, or by other devices in the system or network having some control of the bus. For example, the host often does not need an entire burst of data, thus the host de-asserts the disk drive authorization for data transfer which causes the disk drive 136 to halt or interrupt the communication of the burst and thus completes a sub-burst. The sub-burst data is maintained in a FIFO 142 or PCI 144 and utilized by the host as needed. The remaining data associated with the full burst is maintained in the cache buffer 134, such that the transport stream 138*c* remains active. A full burst of data can be completely transferred through any number of sub-bursts to optimize data communication and use of the bus 135.

Following the transfer of a sub-burst (or a full burst) the disk drive 136 transitions to the next active transport stream (e.g., the transport stream labeled 138*d*). The disk drive again signals a DMARQ and awaits acknowledgement from the host. The disk drive continues this cycle through each of the active transport streams 138*a*-*h* providing the sub-bursts or full bursts to the host.

In one embodiment, one or more active transport streams can be supplying data from a host (e.g., a CPU) through a PCI 140 to the storage medium (e.g., disk drive 136) and retrieving data from the disk drive 136 to be supplied through the PCI to the host. As another example, the IDE drive 132 can direct memory access data to and from the memory 136 to be FIFOed to or from a continuous rate flow, to establish an isochronous transport.

Still referring to FIG. 4, as a FIFO 142 or PCI 144 needs additional data, it simply takes advantage of the drive 136 offering to move data. If the FIFO or PCI does not need additional data, authorization for data transfer is not granted to the drive and the drive controller 132 shifts to the next FIFO 142 or PCI 144 and the disk drive shifts to the next associated buffer 134. In one embodiment, the FIFOs 142 in the drive controller 132 do not have large data storage capacities, but instead are large enough to buffer data between one sub-burst to the next sub-burst. Because the present system and method are capable of communicating in sub-bursts, smaller buffers can be utilized without inhibiting the performance of the system. The buffer size used on each side of the data communication can be optimized for the data type to match the local buffering requirements unique to each side, and different buffer sizes can be used on each side.

In one embodiment, each FIFO 142 and PCI 144 within the drive controller 132 corresponds with one buffer 134 within the disk drive 136. The drive controller 132 can include any number of FIFOs and PCI access ports. For example, the drive controller shown in FIG. 4 includes seven FIFOs 142*a*-142*g*, and one PCI DMA 144. In this example, three of the FIFOs 142*a*-142*c* are utilized for receiving data to be written to the disk drive 136, and four of the FIFOs 142*d*-*g* are utilized for receiving transmitted data from the disk drive. However, any number and combination (receive or transmit) can be utilized. The PCI 144 allows for more traditional communications between the host 112 and the disk drive 136, such as for moving file data, programs and substantially any other data that a computer would traditionally communicate to and from a disk. For example, a host providing TV control might store directory information of the TV guide on the disk drive 136, or substantially anything else a computer would keep. This allows the host to operate like a traditional computer. The present apparatus and method is not limited to one PCI stream 138*h*, but instead can include a plurality of PCIs 144 establishing a plurality of PCI streams.

In the example depicted in FIG. 4 the drive controller 132 and the disk drive 136 allow for a total of eight simultaneously active transport streams 138*a*-*h*. However, any number of transport streams can be established. Generally, the number of transport streams 138 is limited by the number of binary designations available to identify and distinguish between each transport stream (i.e., stream ID). For example, if there are three bi-directional lines 111, the number of transport streams is limited to eight, unless other means are used to distinguish between the transport streams.

In one embodiment, the host 112 maintains control over the data communication. Even though the disk drive 136 may be ready to perform a transfer of data, the host authorizes or denies the transfer. The host can further abort authorized transfers, and can take control of the bus. Not until the host 112 is ready to grant the disk drive 136 control over the data bus (e.g., DMA control), does the host de-assert the bi-directional lines 111 or put the lines into a tri-state or high impedance state. The host 112 then signals the disk drive authorizing the disk drive to control the bi-directional lines 111 (e.g., DA0-DA2) and data bus (e.g., DD0-DD15). The disk drive 136 can then assert the stream ID across the bi-directional lines 111.

Typically, the host 112 retains its traditional role of issuing buffer transfer commands. For example, in writing to the disk drive 136, the host issues a command specifying a disk LBA, the number of sectors to write, and a signal to activate an existing or new transport stream or channel (e.g., a DMA channel). In reading from the disk drive, for example playing back a television program when the host is a digital TV system, the host 112 specifies the LBA, a sector count to read, and a second transport stream or DMA channel 138 for the data to be communicated across. Commands from the host, either for write or read, can be issued without waiting for previous commands to complete. Typically, only one command is pending for a stream at one time, and status information is labeled or tagged with an appropriate stream ID. The disk drive processes the command, allocates buffer space in one of the on-drive cache buffers 134 and initiates the appropriate transfers of data between the cache 134 and the rotating media 137.

The present invention is not limited to the transfer of data between the host 112 and the disk drive 136. The present invention can be implemented within substantially any systems where data is transferred between devices utilizing burst communication. For example, the present invention can be utilized to provide and control sub-bursts of data between a storage device and a periphery device supplying or receiving data.

Figure 5:
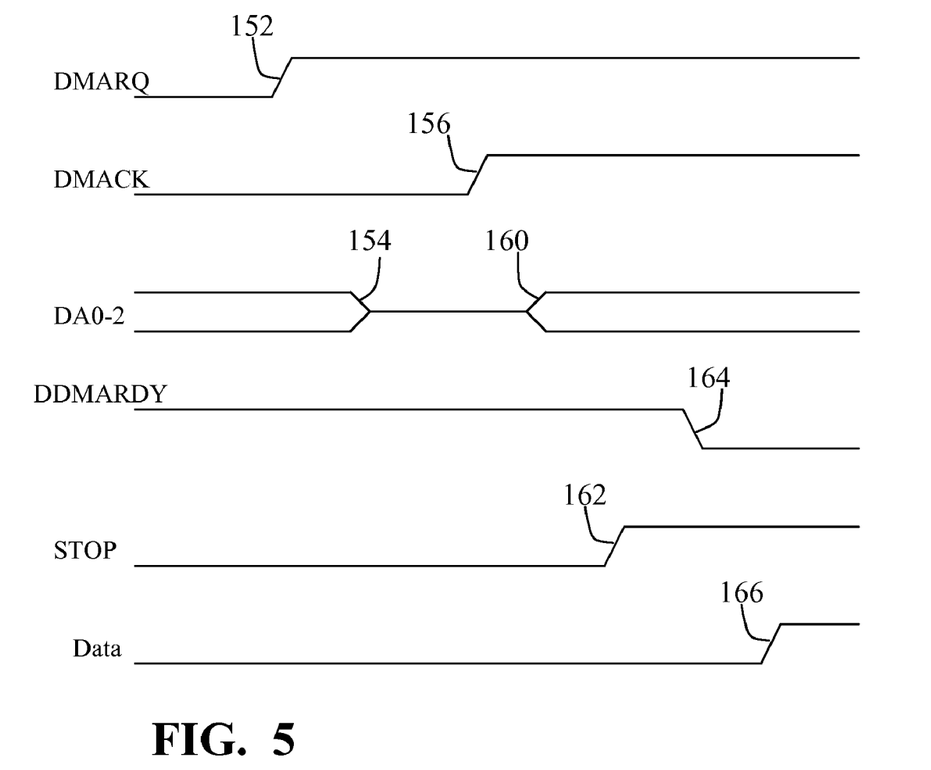
FIG. 5 depicts a timing diagram of communications between the host and the drive to establish the activation of the plurality of data transfers.

In one embodiment, the disk drive 136 communicates with the host to establish timing for the activation and initiation of one or more sub-bursts or full bursts through one or more active transport streams. FIG. 5 depicts a timing diagram of communications between the host and the drive to establish the activation of the plurality of data transfers. In this example, the communication is establishing a disk read. Initially, the disk drive 136 submits or triggers a DMA request (DMARQ) 152. The host 112 registers the DMA request and sets the bi-directional lines 111 into a tri-state or high impedance state 154. The host additionally asserts a DMA acknowledge (DMACK) 156. The drive registers the DMACK and asserts the bi-directional lines 111 to establish the appropriate DMA stream ID 160. The drive additionally asserts a DMA ready command (DDMARDY) 162. The host registers the DMA ready command and if ready to receive data releases or de-asserts a stop (STOP) 164 allowing the drive to initiate the data transfer 166.

Figure 6A:
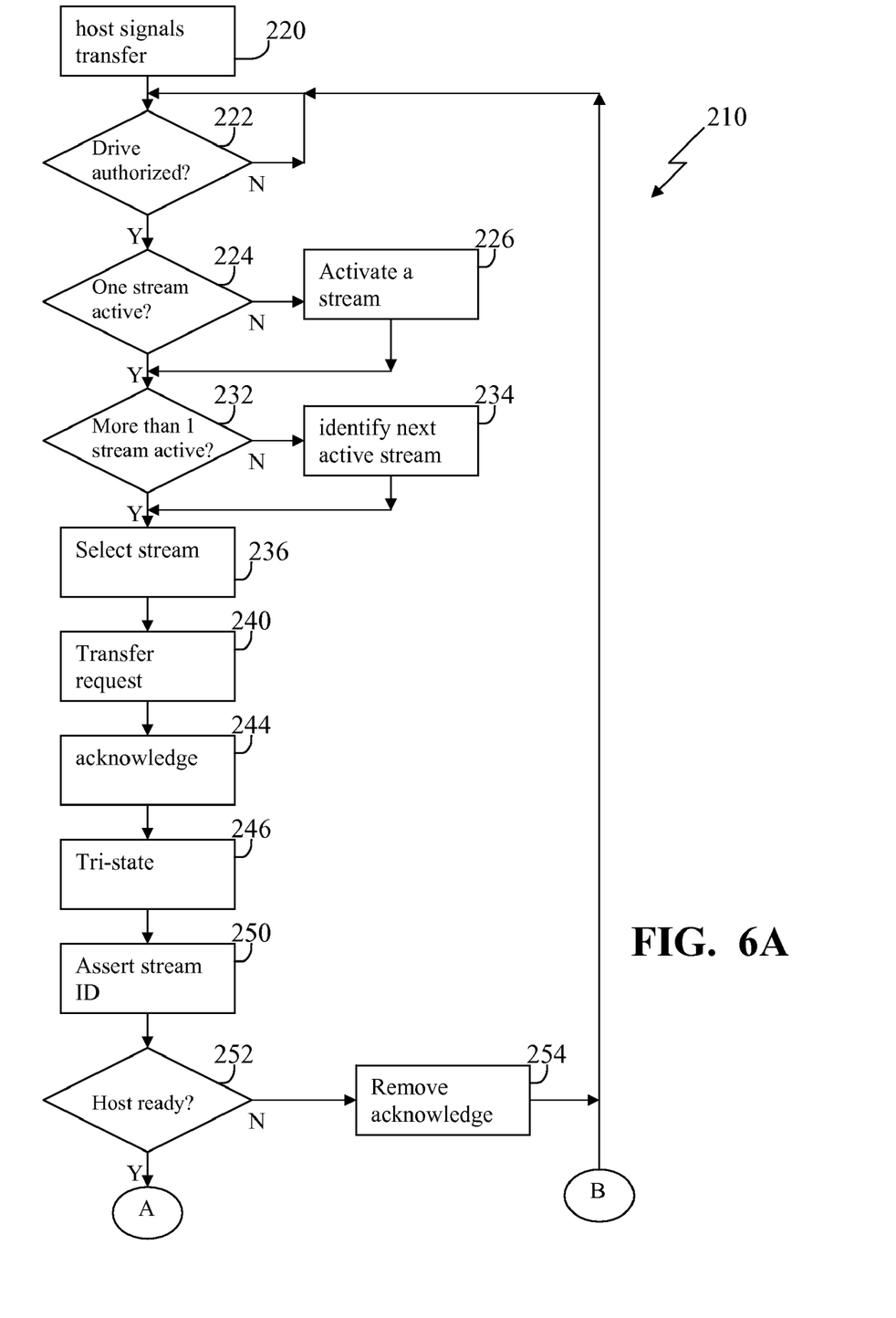
FIGS. 6A-B depict a flow diagram of a process according to one implementation of one embodiment of the present invention for controlling data communication between devices.
Figure 6B:
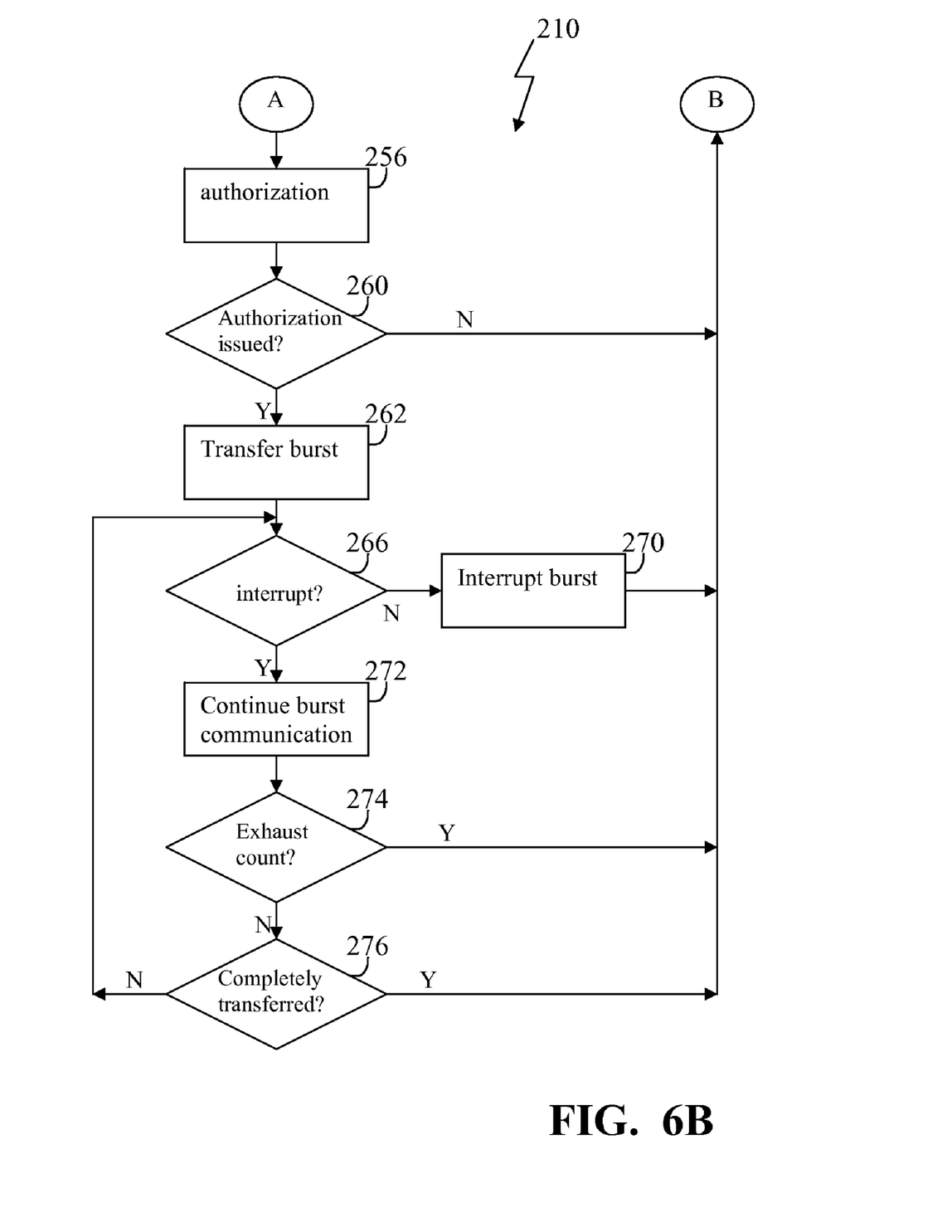

FIGS. 6A-B depict a flow diagram of a process 210 according to one implementation of one embodiment of the present invention for controlling data communication between devices, such as a host 112 and data storage device 136. In step 220, the host signals a grant to the device to initiate the communication of data (e.g., the host can grant DMA bus control). In one embodiment, the host specifies a starting logic block address and total transfer count. The host can additionally specify a burst size and an optimum transfer period for a stream. In step 222, the device awaits the grant to prepare the communication of data. If the grant is not received, the process cycles and awaits the grant. If the grant is received, the process proceeds to step 224 where the device determines if at least one transport stream is active. If not, step 226 is entered where the device activates a stream and prepares the data by, in part, loading data into a cache. If a stream is active, or following the activation of a stream in step 226, the process proceeds to step 232 where the device determines if more than one stream is active. If there is more than one active stream, step 234 is entered where the device identifies the next active stream according to a schedule (e.g., round-robin schedule), a priority or other criteria (for example, if a new stream is activated, the device selects the new stream). If there is only one active stream, or following step 234 where the next stream is determined, step 236 is entered where the device selects an active stream.

In step 240, the device asserts a transfer request (e.g., DMARQ) to the host. In step 244, the host issues an acknowledgement of the transfer request. In step 246, the host tri-states the bi-directional lines 111. In step 250, the device asserts a stream ID for the selected active stream. In step 252, the host receives the stream ID and determines if it is ready for the designated stream. If the host is not ready for the identified stream, step 254 is entered where the host removes the transfer request acknowledgement, and the process 210 returns to step 222. If the host is ready for the transfer of the identified stream, step 256 is entered where the host issues an authorization for the transfer to being (e.g., the host can de-assert a STOP command).

In step 260, the device determines if authorization has been issued. If not, the process returns to step 222. If the authorization has been issued, step 262 is entered where the device initiates the transfer of a first burst of data through the selected and identified transport stream. In step 266, the device determines if an interruption or halt signal has been received to interrupt the transfer of the first burst and not completing the communication of a full burst. This interruption can be received from the host, the device or potentially other devices with data bus control. If an interrupt has been received, step 270 is entered where the device interrupts the transfer of the first burst completing the communication of a sub-burst. The process then returns to step 222. If an interrupt is not received, the process 210 continues to step 272 where the transfer of the first burst is continued.

In step 274, the device determines if a remaining count specified by the host has been exhausted. If the count has been exhausted, the process returns to step 222. If not, step 276 is entered where the device determines if the first burst has been completely transferred. If not, the process returns to step 266 to continue the transfer. If the first burst has been completely communicated, the process returns to step 222 to select the next active transport stream for data transfer.

Figure 7:
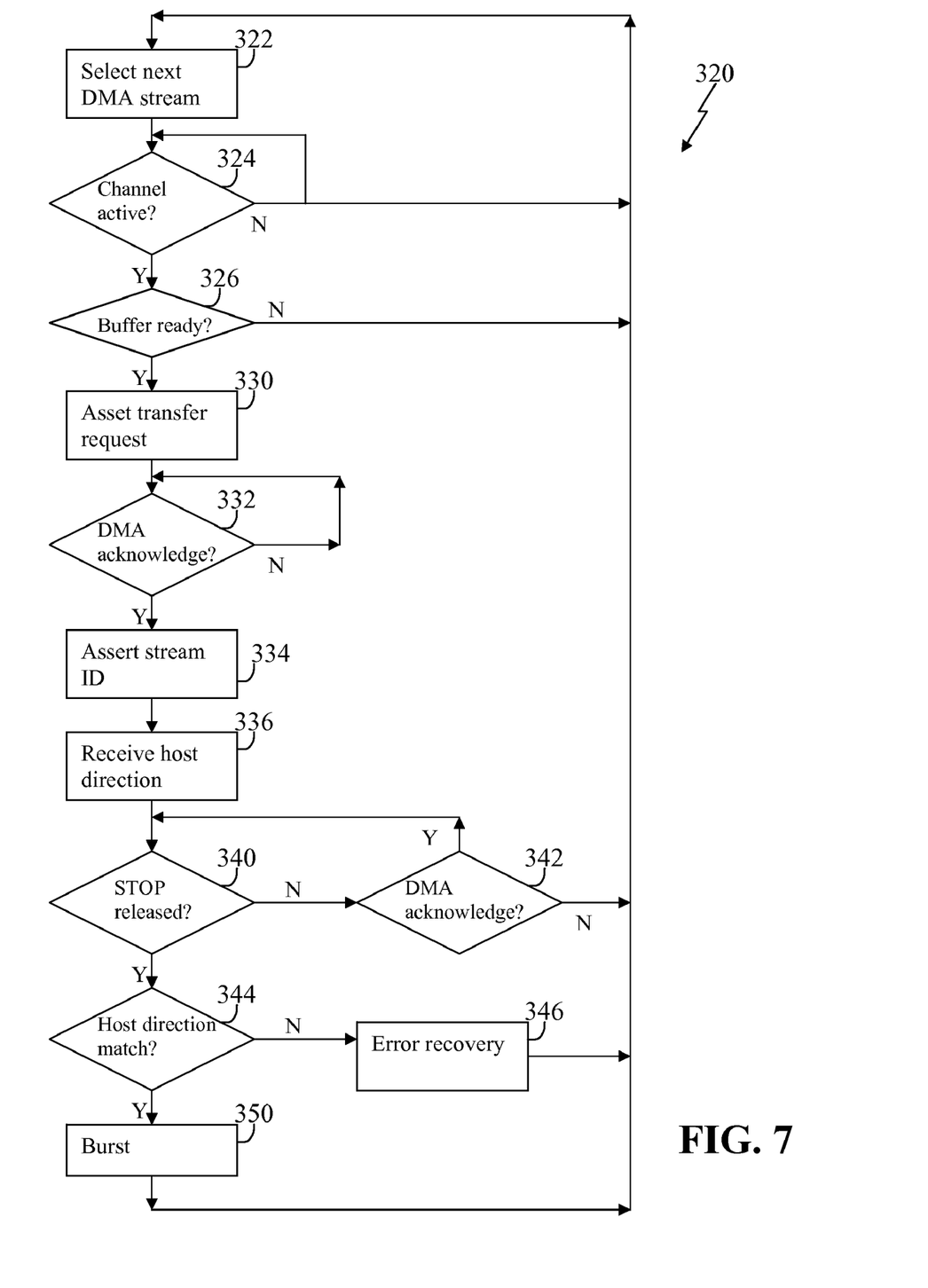
FIG. 7 depicts a flow diagram of one implementation of a process for initiating data communication according to one embodiment of the present invention.

FIG. 7 depicts a flow diagram of one implementation of a process 320 for initiating data communication according to one embodiment of the present invention. In step 322, a disk drive 136, for example the stand-alone DMA controller, cycles through the transport streams and selects a stream. In step 324, it is determined if the transport stream currently selected by the drive controller is active. In step 326, it is further determined if an associated buffer 134 is ready (e.g., the buffer has data from the disk if read command was issued, or has available space if a write command was issued). If the stream is not active or the buffer is not ready, the process returns to step 322 to transition to the next transport stream 138. If the stream is active and the buffer is ready, step 330 is entered where the drive controller asserts a transfer request to the host 112. In step 332, the drive then waits for an acknowledge from the host.

Once the drive controller detects an acknowledge, the process continues to step 334 where the drive asserts the current channel or stream ID onto the bi-directional lines 111. In one embodiment, the data direction is indicated in a traditional manner by a level (i.e., high or low) of a command line or signal, such as a DSTROBE/DDMAREADY-signal. The host 112 can be configured to return the data direction for confirmation, for example the host returns the data direction as the inverse of DSTROBE/DDMAREADY-asserted on a HSTROBE/HDMAREADY-signal line. In step 336, the drive receives the returned data direction. Once the host 112, in one embodiment the host hardware, determines that the direction is stable, the host prepares to route data to or from an appropriate host side buffer, and the host issues authorization, for example by de-asserting a STOP signal, allowing the communication of the data to begin (e.g., allowing the DMA drive controller to initiate a DMA burst). In step 340, the drive waits to receive the authorization.

Alternatively, the host 112 can postpone data transfers for the selected stream, for example, if the host is not ready for the identified stream. Instead of issuing the authorization, the host can remove the DMA acknowledge and abort the transfer. If, in step 340, the authorization is not detected, the process continues to step 342, where it is determined if the DMA acknowledge is still active. If not, the process returns to step 322 to transition to the next stream. If, in step 342, the DMA acknowledge is still active, the process returns to step 340 to determine if the authorization has been issued. This functionality of skipping an active stream provided by the present invention is not available with previous systems, and is in fact in direct conflict with previous protocol specifications. However, the ability to skip a stream provides the present apparatus and method with a maximum versatility for steering channel DMA.

If the host does issue authorization and once the drive detects the authorization in step 340, step 344 is entered where the drive 136 verifies that the host's indication of data direction matches the drive's direction. If the data direction does not match, step 346 is entered where an error recovery sequence is launched. Typically, the error recover sequence is similar to that of other error recovery sequences known in the art such as an interrupt from the interface to the controlling host alerting it to the contingency. If the data directions do match, step 350 is entered where the drive initiates the data transfer. Typically, the sub-burst data transfer follows data transfer procedures similar to traditional DMA burst procedures. During the data transfer, the drive continues to assert the bi-directional lines 111 indicating the stream ID. The sub-burst may be terminated by either the drive 136 or the host 112 using traditional signaling methods.

If a sub-burst exhausts a buffer transfer count, traditional methods along with an indication of the stream ID provides a completion status to the host. The indicated stream is flagged as idle in the disk drive 136 until another buffer transfer command is issued by the host 112. Once a sub-burst has been completed, the drive cycles to the next active stream and determines if the next stream is ready to service. The rotation to cycle to each of the plurality of active streams continues as long as there is a data transfer pending.

In one embodiment, the disk drive 136 is configured or programmed to provide the transport streams based on a priority scheme. For example, a first transport stream 138a (see FIG. 4) can be given a higher priority than all the remaining streams. As such, the stream rotation performed by the drive may consist of starting with the first transport stream 138a. After transferring a sub-burst or full burst from the first stream 138a, the disk drive 136 rotates to the second transport stream 138b. After transferring data from the second stream 138b, the drive 136 rotates back to the first transport stream 138a. After again transferring data from the first stream 138a, the drive 136 rotates to the third transport stream 138b, then back to the first stream 138a, and continues this cycle.

Other similar priority schemes can be utilized. For example, the host 112 can designate one of the transport streams as having a higher priority. The drive 136 can then implement the priority based on the amount of priority specified. For example, if the host issued a high priority, the drive might follow the scheme just described, e.g., stream 1, stream 2, stream 1, stream 3, etc. Alternatively, if the priority is a middle priority, the scheme may be, for example, stream 1, stream 2, stream 3, stream 4, back to stream 1, then forward to stream 5, stream 6, stream 7, stream 8, then back to stream 1, etc.

Typically, however, the host is ultimately in control including controlling the priority of streams. If the disk drive 136 issues a DMARQ, the host 112 issues a grant acknowledge, and the drive asserts the stream ID onto the bi-directional lines 111. The host detects the stream ID identifying the stream (which buffer) over which the drive wants to initiate a data transfer (receiving or transmitting). The host can then determine whether it wants to allow the transfer of data over the identified stream at that point in time. If the host does not want to allow the transfer over the stream, the host 112 can drop the acknowledge grant without giving a ready or authorization. The drive would then cycle to the next active stream. The host can continue to deny issuing the ready command for initiating data transfers as the drive cycles through the streams until the host recognizes the desired transport stream. The host can cause the drive to quickly cycle through the streams 138a-h (typically, in a matter of micro-seconds) allowing the host to control the drive to initiate data transfer of the desired stream.

The present invention facilitates the transfer of multiple streams of data interleaved across a communication interface, such as an IDE interface or other such interfaces. One implementation of the present invention would be to include the present apparatus and method within a Personal Video Recorder (PVR) application. This permits an incoming media stream to be recorded "live" and then be played back, for example played back only slightly delayed or replayed at a later time, and further allows skipping through the media stream, both forward and backward. One example is digital TV or digital recording, such as Tivo™, crystal video recording or other similar devices. An example of an application would be to receive three media streams (e.g., TV programs), time shifting two of the programs to be played back for viewing, and background record the third.

An example of this application is if a user is watching two programs, a primary program A and a secondary program B, such as a basketball game A and a basketball game B, and recording a third program C, such as a movie. The primary program A (game A) is shown on the screen in full form while the secondary program B (game B) can be shown in a small sub-screen (commonly referred to as picture in picture (PiP)).

Figure 8:
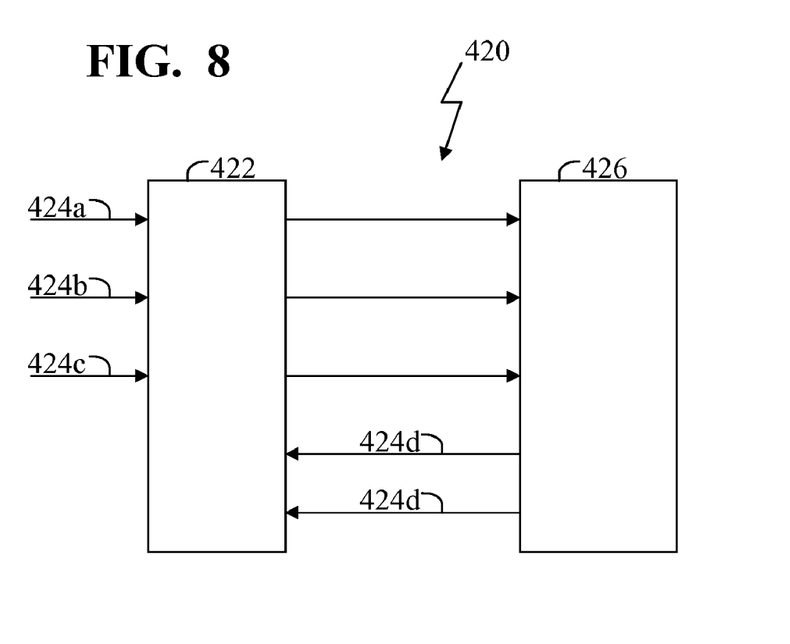
FIG. 8 depicts a simplified block diagram of a system according to one embodiment of the present invention, where the system receives and plays back a plurality of programs.

FIG. 8 depicts a simplified block diagram of a system 420 according to one embodiment of the present invention. In this example, the host 422 receives the three programs (A, B and C) 424a-c. The host forwards the programs 424a-c to the storage device 426 to record the programs as they are received. The system additionally plays back both primary and secondary programs 424d and 424e from the storage device to the host allowing the host 422 to display the two programs such that a user can view the programs. Therefore, the system has five (5) simultaneously active streams. Three streams 424a-c are being recorded and two streams 424d-e are being replayed.

Again, with previous systems these five streams must share the single data bus while performing excessively large full data bursts. The drives can generally receive and deliver much greater amounts of data than can be utilized. As such, excessively large buffers are needed in both previous drives and hosts in order to receive and transmit the full bursts.

Alternatively, the present invention maintains five simultaneously active transport streams and communicates data utilizing sub-bursts, reducing the size of buffers needed and providing smoother data communication. When the host 422, in this example the digital television system, is ready to communicate data (to or from the host) the host signals the data storage device 426 and frees up the bi-direction data address lines. The storage device 426 submits a DMARQ, which is followed by a bit address indicating the transmit stream ID of the current stream once grant has been asserted by the host.

The host recognizes the stream ID address. For example, if the stream is part of the primary program 424a received by the system 420 to be written to the disk, the host recognizes the stream and prepares to write the data for the primary program to the storage device.

Because the host has instructed the storage device 426 on how to assign the addresses the host hardware recognizes the stream ID as requiring the host to push (write) data out to the storage device. The host pushes data out to the storage device until the storage device drops its request, or the host has no more data to send, or the sub-burst or burst time expires. The host handshakes the DMACK and communicates the sub-burst of data from the host to the storage device. The host then removes the DMACK. The storage device recognizes that the host is done communicating data associated with the primary stream 424a. The storage device 426 then round-robins to the next active stream, asserts a DMARQ for the next stream, and asserts the stream ID on the bi-directional address for the next stream once DMACK has been asserted.

The host recognizes the stream and prepares for data communication. For example, if the next stream is the playback stream 424d of the primary stream, the host recognizes the stream and prepares to receive data from the storage device 426. The host issues the DMACK and authorization, and the storage device begins communicating the playback stream 424d. For example, if the host is ready to take a sub-burst of 4 or 5 bytes of data on that particular stream, the host handshakes the acknowledge grant to pull the desired number of bytes of data from the storage device for playing back program 424d, then de-asserts the acknowledge completing the sub-burst.

The storage device 426 continues to cycle through the different streams and buffers to allow sub-bursts of data to be communicated. Therefore, both the storage device 426 and the host 426 receive data at their own optimum rate.

In one embodiment, the present invention allows the data storage and the caching to be moved onto the disk drive. Buffering on the disk drive is more practical because the disk drive is closer to the rotating media where the data has to be buffered anyway. This additionally avoids the necessity of the host having to maintain another copy of the same buffer (at least a large percentage of the data), and further allows the host to avoid moving the data as large bursts from the disk drive into the host local memory and then pull the data out of the local memory a little bit at a time. Moving the caching and storage onto the disk drive also reduces latencies relating to moving large blocks of data at one time and being committed to the large burst period before the host can start another data transfer. In one embodiment, the present invention moves the buffer management down into the hardware level. This allow the present invention of provide data communication with a hand off by software instead of the software managing the buffering process, providing a more efficient communication control.

The present invention optimizes the use of the bus. Further, the optimized use of the bus is established without interfering with previous systems and previous methods of communicating data (i.e., communicating with large bursts). The present invention can be implemented in previous systems to operate in a similar manner as previous systems providing the large burst communication. However, when activated, the present apparatus and method optimize the use of the bus by, in part, allowing a plurality of transport streams to be active at the same time, all sharing the bus for discrete times to communicate a part of a burst (sub-burst). Even when active, the present apparatus and method are capable of communicating an entire burst of data if this optimizes the bus and communication, or if other components of the system or network are not capable of transmitting or receiving a sub-bursts.

As such, the present system can still have one stream operating similar to previous systems, providing full burst communication. The present invention can additionally continue communicating other active streams utilizing the sub-bursts to share the bus and optimize communication and system resources. The system may lose some of the efficiency associated with sub-burst communication, but remains compatible with previous devices unable to take advantage of sub-bursts. Previous devices or programs that use the drive to communicate full bursts issue commands as it did before using the burst mode. The devices or programs configured to take advantage of the present invention issue commands to allow them to take advantage of sub-burst communications. The present invention allows both full burst devices and/or programs as well sub-burst devices and/or programs to co-exist without interfering with each other.

In one embodiment, the present invention is capable of operating in a first mode similar to that of pervious systems providing full burst communication, and in a second mode providing the plurality of active transport streams with the ability to communicate in sub-bursts. To operate in the second mode and take advantage of the functionality of the present invention, the host 112, for example a computer, signals or configures the peripheral storage device 136 to operate in a steered DMA mode enabling a plurality of transport streams to be simultaneously active. As such, both parties to the interface, the host 112 and the device 136, know that the present apparatus and method are being used in place of the traditional half duplex, single buffer, DMA. In one embodiment, mode configuration is performed once per session and can be preserved in non-volatile memory between sessions.

The present invention can be implemented through and incorporated in any number of devices and/or systems including, but not limited to, IDE, ATA, ATAPI and ATA/ATAPI devices. Many ATA, ATAPI and ATA/ATAPI devices include data pins that include the unidirectional data address lines DA0-DA2. According to the present invention, these devices are engineered to allow the data address lines DA0-DA2 to be bi-directional, such that these data address lines can be utilized to designate which of the plurality of active transport streams is transferring data enabling accurate routing of the data as described above. The present invention can also be implemented within a server or home server, where a plurality of computers or programs access the disk drive located at a central location within a building, office or home. The present invention can also be implemented within a video on demand situation, where the buffering is maintained on the disk drive instead of having to require large buffers additionally on the host computer controlling the video on demand.

While the invention herein disclosed has been described by means of specific embodiments and applications thereof, numerous modifications and variations could be made thereto by those skilled in the art without departing from the scope of the invention set forth in the claims.

What is claimed is:

1. A method for controlling a flow of communication between a host and a data storage device, comprising:
   maintaining a plurality of data transport streams active;
   receiving, at the host, a request from the data storage device to initiate a first data transfer;
   acknowledging the request;
   receiving, at the host and from the device, an asserted first stream identification (stream ID) for the first transport steam;
   determining whether to authorize the first transport stream;

initiating a first burst of data for a first transport stream between the host and the data storage device comprising authorizing the initiation of the first burst of the first transport stream when it is determined to authorize the first transport stream;

interrupting the first burst of the first transport stream prior to completing the communication of the first burst of data of the first transport stream and maintaining the first transport stream active;

initiating a first burst of data for a second transport stream while maintaining the first transport stream active;

interrupting the first burst of the second transport stream prior to completing the communication of the first burst of data of the second transport stream while maintaining the first transport stream active, and maintaining the second transport stream active;

continuing the first burst of the first transport stream while maintaining the second transport stream active;

receiving an asserted second stream ID designating a third transport stream prior to receiving the asserted first stream ID; and determining that the third transport stream is not to be authorized; and denying authorization to initiate a first burst of the third transport stream.

2. The method of claim 1, further comprising:

prior to the continuing of the first burst of the first transport stream:
- initiating a first burst of data of a third transport stream while maintaining the first and second transport streams active;
- interrupting the first burst of the third transport stream while maintaining the first and second transport streams active; and
- maintaining the third transport stream active.

3. The method of claim 1, further comprising:

prior to the continuing of the first burst of the first transport stream:
- initiating a first burst of data of a fourth transport stream while maintaining the first and second transport streams active; and
- communicating the entire first burst of the fourth transport stream while maintaining the first and second transport streams active.

4. The method of claim 1, further comprising:

transmitting from the storage device to the host the request to initiate a data transfer;

receiving the acknowledgement of the request;

asserting, at the storage device, the stream ID for the first transport stream; and receiving an authorization of the initiation of the first burst of the first transport stream.

5. The method of claim 1, further comprising the steps of:

again interrupting the first burst of the first transport stream while maintaining the first transport stream and the second transport stream active; and continuing the first burst of the second transport stream while maintaining the first transport stream active.

6. The method of claim 1, further comprising:

prior to the step of continuing the first burst of the first transport stream and while maintaining the first and second transport streams active:
- asserting the second stream ID for the third transport stream;
- failing to receive an authorization for the third transport stream;
- preventing an initiation of a first burst of the third transport stream; and
- maintaining the third transport stream active.

7. The method of claim 1, further comprising:

transmitting the assertion of the first stream ID of the first transport stream prior to the initiating of the first burst of the first transport stream; and receiving routing of the data of the first burst of the first transport stream based on the first stream ID.

8. The method of claim 1, further comprising the steps of:

receiving the assertion of the first stream ID of the first transport stream prior to the initiating of the first burst of the first transport stream; and determining, based on the first stream ID, which data from a plurality of sets of data is to be included in the first transport stream.

9. A method of transferring data, the method comprising:

initiating, from a first apparatus, a communication of a first burst of data over a first transport stream to a second apparatus;

detecting an indication to interrupt the first burst of data of the first transport stream;

interrupting the first burst and completing a communication of a first sub-burst of the first burst that is less than the first burst of data, and maintaining the first transport stream active;

initiating a communication of a first burst of data over a second transport stream while maintaining the first transport stream active;

re-initiating the communication of the first burst of the first transport stream;

prior to the re-initiating the communication of the first burst of the first transport stream:
- detecting an indication to interrupt the first burst of the second transport stream;
- determining that a third active transport stream has a highest priority of a plurality of active transport streams comprising least the first, second and third transport streams at the time the first burst of the second transport stream is interrupted; and
- activating a communication of a burst of data of the third transport stream while maintaining the remaining plurality of active transport streams active.

10. The method of claim 9, further comprising:

interrupting, in response to the detecting the indication to interrupt the first burst of the second transport stream, the first burst of the second transport stream and completing a communication of a first sub-burst of the first burst of the second transport stream while maintaining the first transport stream active and further second transport stream and completing communication of a first sub-burst of the first burst of maintaining the second transport stream active while implementing the re-initiation of the communication of the first burst of the first transport stream.

11. The method of claim 10, further comprising:

receiving a first authorization to initiate a transfer of a burst of data; and wherein the interrupting the first burst of the first transport stream comprises interrupting the first burst of the first transport stream prior to completing the communication of the authorized burst of data, and maintaining the first transport stream active.

12. The method of claim 10, further comprising:

communicating an identification of a fourth transport stream;

requesting to communicate a first burst of data of the fourth transport stream;
determining that authorization is not received to communicate the first burst of the fourth transport stream; and
requesting to communicate a first burst of data of a fifth transport stream in response to determining that the authorization to communicate the first burst of the fourth transport stream is not received.

13. A system for managing data transfers, comprising:
a host having a plurality of stream identification (stream ID) inputs;
a data storage device having a plurality of stream ID outputs coupled with the stream ID inputs, such that the data storage device is configured to assert a plurality of stream IDs identifying to the host one of a plurality of transport streams; and
the host being configured to determine routing of data transferred through the plurality of transport streams based on the stream IDs received from the data storage device;
wherein the data storage device is further configured to:
initiate a first burst of data for a first transport stream;
interrupt tire first burst and completing a transfer of a first sub-burst of data;
maintain the first transport stream active after interrupting the first burst;
initiate a transfer of a second burst of data through a second transport stream; and
interrupt the second burst and completing the transfer of a second sub-burst of data, to re-assert a first stream ID and to continue to transfer the first burst of data though the first transport stream.

14. The system of claim 13, wherein:
the data storage device includes a plurality of caches, such that the plurality of caches of the data storage device are configured to store data and establish and maintain the plurality of transport streams simultaneously active, where the plurality of transport streams are configured to transfer data between the host and the data storage device.

* * * * *

UNITED STATES PATENT AND TRADEMARK OFFICE
CERTIFICATE OF CORRECTION

PATENT NO. : 7,668,967 B2
APPLICATION NO. : 11/935294
DATED : February 23, 2010
INVENTOR(S) : Robert Allan Unger It is certified that error appears in the above-identified patent and that said Letters Patent is hereby corrected as shown below:

In the CLAIMS:
  Claim 1, column 14, line 66, delete "steam" and insert --stream--.
  Claim 9, column 16, line 38, after "comprising" insert --at--.
  Claim 10, column 16, lines 51-53, after "further" delete "second transport stream and completing communication of a first sub-burst of the first burst of".
  Claim 13, column 18, line 3, delete "tire" and insert --the--.
  Claim 13, column 18, line 12, delete "though" and insert --through--.

Signed and Sealed this

Eighth Day of June, 2010

David J. Kappos
*Director of the United States Patent and Trademark Office*